US012794135B2

(12) United States Patent
Hamoudi et al.

(10) Patent No.: US 12,794,135 B2

(45) Date of Patent: Nov. 10, 2026

(54) OPTIMIZED LOG-PERIODIC TOOTH ANTENNA WITH MULTI-OUTPUT AND WIDEBAND FREQUENCY CAPTURE

(71) Applicant: Qatar Foundation for Education, Science and Community Development, Doha (QA)

(72) Inventors: Hicham Hamoudi, Doha (QA); Manal Alsalama, Doha (QA); Atef Zekri, Doha (QA)

(73) Assignee: Qatar Foundation for Education, Science and Community Development, Doha (QA)

( * ) Notice: Subject to any disclaimer, the term of this patent is extended or adjusted under 35 U.S.C. 154(b) by 88 days.

(21) Appl. No.: 18/943,143

(22) Filed: Nov. 11, 2024

(65) Prior Publication Data

US 2025/0158284 A1 May 15, 2025

Related U.S. Application Data

(60) Provisional application No. 63/548,249, filed on Nov. 13, 2023.

(51) Int. Cl.
*H01Q 11/10* (2006.01)
*H01Q 5/20* (2015.01)

(52) U.S. Cl.
CPC ............... *H01Q 11/10* (2013.01); *H01Q 5/20* (2015.01)

(58) Field of Classification Search
CPC ................................ H01Q 11/10; H01Q 5/20
See application file for complete search history.

(56) References Cited

U.S. PATENT DOCUMENTS 4,063,249 A * 12/1977 Bergander ........... H01Q 25/001 343/837
5,164,738 A * 11/1992 Walter .................. H01Q 25/04 343/789

(Continued)

OTHER PUBLICATIONS

Telfer, et al.; "Design and Optimization of Log Periodic Toothed Antenna for UWB Applications"; International Journal of Engineering Innovation & Research; vol. 2, Issue 2; 2013; (4 pages).

(Continued)

*Primary Examiner* — Hai V Tran

(74) *Attorney, Agent, or Firm* — K&L Gates LLP

(57) ABSTRACT

Apparatus and methods of use for a log periodic antenna having a first arm and a second arm positioned opposite a center from the first arm. Each arm is divided into a plurality of zones, and each zone is configured to harvest signals of a specific frequency range. The plurality of zones collectively harvests signals spanning across a frequency range, the frequency range being at least one of a variety of ranges. The antenna has a parallel connection system including a plurality of connections, wherein the plurality of connections includes non-crossing connections between zones of the first arm and zones of the second arm configured to harvest signals of a same frequency range. The antenna has a plurality of multi-output channels, each output channel coupled to one of the non-crossing connections, and each multi-output channel having multiple feeding points, each capable of accommodating a receiver operating over multiple frequencies.

11 Claims, 2 Drawing Sheets

(56) References Cited

U.S. PATENT DOCUMENTS

| | | | | | |
|---|---|---|---|---|---|
| 5,952,982 | A * | 9/1999 | Jorgenson | H01Q 11/10 | 343/797 |
| 6,011,522 | A * | 1/2000 | VanHoozen | H01Q 11/105 | 343/859 |
| 6,211,839 | B1 * | 4/2001 | Campbell | H01Q 1/38 | 343/792.5 |
| 8,068,065 | B1 * | 11/2011 | Struckman | H01Q 13/10 | 343/769 |
| 2006/0262023 | A1 * | 11/2006 | Engargiola | H01Q 19/062 | 343/895 |
| 2019/0267715 | A1 * | 8/2019 | Cao | H01Q 11/10 | |
| 2024/0305001 | A1 * | 9/2024 | Badger | H01Q 11/10 | |

OTHER PUBLICATIONS

Engargiola, et al.; "Planar channelized log-periodic antenna"; IEEE; Sep. 2005; (4 pages).

Deliri, et al.; "An extendable single-input reduced-switch 11-levelswitched-capacitor inverter with quintuple boosting factor"; IET Generation, Transmission & Distribution, Wiley; Jan. 2022; (11 pages).

Ibrahim, et al.; "A Novel Compact High Gain Wide-Band Log Periodic Dipole Array Antenna for Wireless Communication Systems"; Journal of Infrared, Millimeter, and Terahertz Waves; 2022; (23 pages).

* cited by examiner

OPTIMIZED LOG-PERIODIC TOOTH ANTENNA WITH MULTI-OUTPUT AND WIDEBAND FREQUENCY CAPTURE

PRIORITY CLAIM

This application claims the benefit of and priority to U.S. Provisional Patent App. 63/548,249, filed Nov. 13, 2023, the entire disclosure of which is incorporated by reference herein.

BACKGROUND

Antennas are dual-function conductive systems that enable the transmission and reception of freely propagating electromagnetic waves in space, resulting in the conversion of these waves into electrical signals, for example electrical signals fed to a circuit connected to an antenna. The use of an antennas may allow for enhancing performance in a variety of applications, such as detection, sensing, photoemission, and energy harvesting. If an antenna operates as a receiving device, its fundamental capability is represented by its ability to convert the electromagnetic waves into alternating current (AC) at its surface and the amount of the generated voltage at its feeding points.

Antennas can be designed to operate at a particular frequency or over a wide frequency band. The ability of the antenna to capture the electromagnetic waves over a large bandwidth is crucial for increasing the radiation collection and conversion efficiency. Therefore, wideband multi-frequency antennas may be designed to be capable of harvesting the energy from wide frequency bands available in the surrounding environment. In this context, broadband antennas offer advantages over a narrow spectra antennas for higher rate data transmitting, detecting, and collecting of electromagnetic waves. However, for an efficient capturing the characteristic dimensions of the antenna are dependent on the targeted wavelength which complicates the designing and fabricating processes because of the different wavelengths that are involved. In this regard, various geometries and arbitrary self-similar antenna designs have been extensively investigated, both theoretically and experimentally; these designs include bowtie, fractal, spiral, and log-periodic antennas.

A log-periodic antenna is a broadband antenna that is an extension of the bowtie antenna that exploits the circularity concept of spiral antennas by incorporating multi-teeth around the main bowtie element. The bowtie element is typically characterized by electrically conducting and logarithmic-periodic elements. The dimensions of the elements as well as the space between them are determined by the frequency range in which the antenna is designed to operate efficiently. Log-periodic antennas have a very wide frequency bandwidth with negligible variation of electrical performance. Log-periodic toothed antenna have been proposed for harvesting wide range of RF energy from 400 MHz to 2.4 GHz and from 0.8 GHz to 2.6 GHZ, whereas in another work, it has been proposed for thermal radiation harvesting from 6 THz to 100 THz. In another study, log-periodic antenna showed a high gain response over a wideband from 5.2 GHz to 40 GHz. Another specially designed log-periodic antenna showed a high radiation efficiency over a wide frequency range from 0.2 THz to 1 THz.

Typically for a single antenna, the output oscillations are collected at one common feeding point at the center of the antenna. Therefore, the multi-outputs signals generated at different zones of the antenna are not discriminated according to multi-incident waves frequency bands. Despite the strong output field obtained from collecting wideband radiations [17], it is of great interest to provide multi-channels for the propagation of multi-output oscillations and collect them at separate terminals. This in turn enables the accommodation of multi-receivers operating at different frequency ranges in a small, compacted area. In addition, it can provide a direct control over the multi-output terminals by separating their outcomes, eliminating specific undesired range of frequency, or combining them at one common point. In this context, multi-input multi-output channels system can be introduced. This system is known for its efficient exploiting of the spatial domain by providing parallel subchannels in the multipath propagation environment. Although this concept has been used in wireless communication systems and offers high channel capacities, it has not been employed for the discrimination of multi-frequency bands at different terminals.

Accordingly, there is a need for a single antenna capable of achieving these above mentioned design constraints experienced by conventional antennas.

SUMMARY

The present disclosure provides for a novel log-periodic tooth antenna that allows for wideband performance while maintaining a compact form and utilizing a novel parallel connection system which leverages non-crossing connections to reduce interference.

In an example embodiment, which may be combined with any other embodiment herein, the present disclosure includes log-periodic tooth antenna comprising a first arm and a second arm positioned opposite a center from the first arm. Each arm is divided into a plurality of zones, and each zone is configured to harvest signals of a specific frequency range. The plurality of zones collectively harvests signals spanning across a frequency range, the frequency range being at least one of a variety of ranges. The antenna also has a parallel connection system including a plurality of connections, wherein the plurality of connections includes non-crossing connections between zones of the first arm and zones of the second arm configured to harvest signals of a same frequency range. Also, the antenna has a plurality of multi-output channels, each output channel coupled to one of the non-crossing connections, and each multi-output channel having multiple feeding points, each capable of accommodating a receiver operating over multiple frequencies.

In another aspect of the present disclosure, which may be combined with any other aspect herein, the antenna further comprises a controller configured to control the plurality of multi-output channels and to modify the signals transmitted across the parallel connection system.

In another aspect of the present disclosure, which may be combined with any other aspect herein, each zone is sized in order of a desired radiation wavelength for the targeted frequency bands.

In another aspect of the present disclosure, which may be combined with any other aspect herein, generated oscillations in each zone propagate through a specific channel connected to a counterpart of the channel in the opposite arm without crossing other channels.

In another aspect of the present disclosure, which may be combined with any other aspect herein, the multi-output channels and multiple feeding points allow for the discrimination of output oscillations according to multi-incident waves frequency bands.

In another aspect of the present disclosure, which may be combined with any other aspect herein, the direct control of various output channels facilitates the adaptation of the antenna for different applications, including at least one of detectors, sensors, optical rectennas, and wireless communications systems including at least one of 4G, 5G, and 6G.

In another aspect of the present disclosure, which may be combined with any other aspect herein, the antenna has a compact design which enables integration with multiple other antennas.

In another aspect of the present disclosure, which may be combined with any other aspect herein, the parallel connection system between corresponding zones in the opposite antenna arms allows for the blocking of undesired frequency bands without affecting a response to other frequency bands by the antenna.

In another aspect of the present disclosure, which may be combined with any other aspect herein, the disclosure includes a method of operating the antenna. The method includes capturing wideband frequencies from the surrounding environment through the multiple zones with varying sizes, propagating the generated oscillations in each zone through a specific channel connected to its counterpart in the opposite arm, discriminating the output oscillations at the multi-output channels and multiple feeding points, accommodating multiple receivers operating over different frequency ranges, and controlling the output channels by separating, combining, or suppressing output signals according to the required operating frequency range.

In another aspect of the present disclosure, which may be combined with any other aspect herein, controlling the output channels allows for the customization of the antenna's response based on the desired application, including at least one of detection, sensing, energy harvesting, and wireless communication systems.

In another aspect of the present disclosure, which may be combined with any other aspect herein, controlling the output channels facilitates the adaptation of the antenna for different applications, including at least one of detectors, sensors, rectennas, and wireless communications systems including at least one of 4G, 5G, and 6G.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

The present disclosure provides new and innovative apparatus and methods for a log periodic antenna configured to allow for wideband, multi-channel operation.

Figure 1:
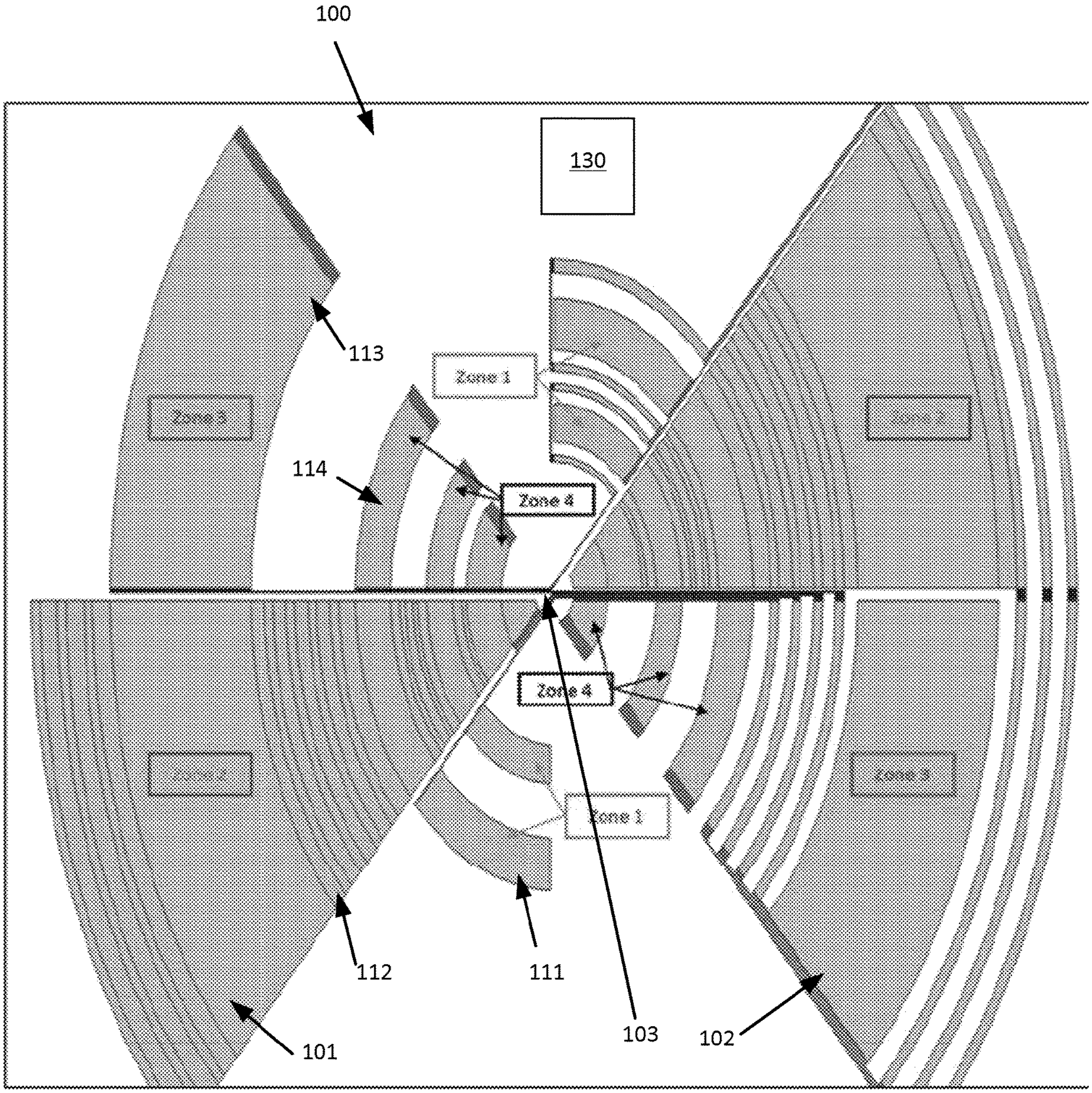
FIG. 1 illustrates an example embodiment of an antenna according the present disclosure.

FIG. 1 depicts a log periodic antenna of the present disclosure implemented. The antenna 100 may include two arms, a first arm 101 and a second arm 102, with the first arm 101 positioned opposite a center 103 from the second arm 102. Each arm may be divided into a plurality of zones, for example a first zone 111, and second zone 112, and third zone 113, and a fourth zone 114. The zones and the division of the zones on the first arm 101 may be the same or complementary to the zones on the second arm 102, and each zone may be configured to harvest signals of a specific frequency range. For example, the first arm 101 may contain a first zone 111 configured to harvest microwave signals, and the second arm 102 may have a corresponding zone configured to harvest signals of the same specific frequency range as the first zone 111 of the first arm 101.

Each zone may be configured to harvest signals of a specific frequency range. This specific frequency range may be one of the following: a microwave frequency range, a terahertz frequency range, an infrared frequency range, a visible light frequency range, and ultra-violet frequency range. Collectively, the plurality of zones may be configured to harvest signals of a frequency range that spans the microwave frequency spectrum, the terahertz frequency spectrum, an infrared frequency spectrum, a visible light frequency spectrum, and ultra-violet frequency spectrum. The antenna separates the outputs of these different frequencies at different terminals.

Figure 2:
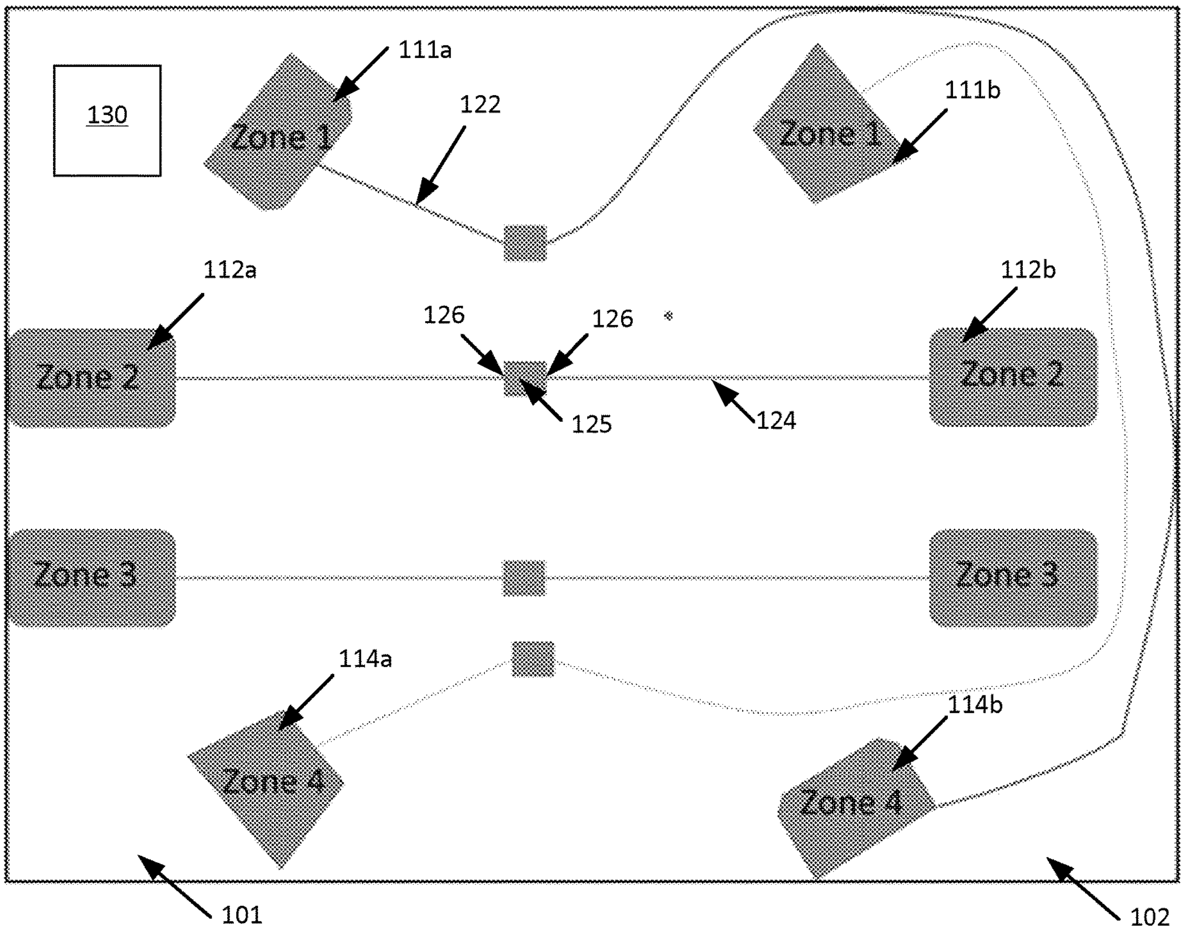
FIG. 2 illustrates an example embodiment of a parallel connection system of the present disclosure.

FIG. 2 illustrates a parallel connection system of an antenna of the present disclosure. The parallel connection system 120 including a plurality of connections, wherein the plurality of connections includes non-crossing connections between zones of the first arm and zones of the second arm configured to harvest signals of a same frequency range. In this way, the antenna provides multi-terminals feeding multi-receivers. For example, a connection 122 may extend from a first zone 111*a* of the first arm to a fourth zone 114*b* of the second arm 102, with the connection 122 not crossing any other connection in the parallel connection system.

The antenna may also include a plurality of multi-output channels. Each output channel may be coupled to one of the non-crossing connections, and each multi-output channel having multiple feeding points 126, each capable of accommodating a receiver operating over multiple frequencies. For example, multi-output channel 125 may be positioned on connection 124 between a second zone 112*a* of the first arm 101 and the second zone 112*b* of the second arm 102.

In some embodiments, the antenna may be coupled to a controller 130, for example via a receiver, configured to control the plurality of multi-output channels and to modify the signals transmitted across the parallel connection system. For example, the controller 130 may manage the separation of output signals, the combination of signals at a common point in the system, and suppress or filter certain signals, to control the output signal magnitude and optimal frequency operating range. For example, the controller 130 may block any channel with an undesired frequency band without affecting the antenna response to other frequency bands. In the disclosed antenna, instead of an unrecoverable removal of the resonant elements to achieve this effect, the frequency range outputs are discriminated at different terminals. The terminals can then be fully or partially connected, and the undesired frequency can be easily suppressed while keeping the antenna structure with all resonance elements to be activated and utilized when needed. If desired, the controller 130 can also cause various channels' outputs to be combined at a common point.

The disclosed antenna also provides the possibility of accommodating multi-receivers at the center of a single antenna. This helps in providing unused space for integrating multiple antennas compared to conventional systems, which typically integrated multi-receivers, each working at a different frequency range. The disclosed antenna can be integrated into an array system which can operate an equal number of receivers as compared to conventional arrays and with comparable or better efficiency, but in a more spatially compact design.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

The invention is claimed as follows:

1. A log-periodic tooth antenna comprising:

a first arm;

a second arm positioned opposite a center from the first arm, wherein each arm is divided into a plurality of zones, and each zone is configured to harvest signals of a specific frequency range, and the plurality of zones collectively harvests signals spanning across a frequency range, the frequency range being at least one of (i) a microwave frequency range, (ii) a terahertz frequency range, (iii) an infrared frequency range, (iv) a visible light frequency range, and (v) and ultra-violet frequency range;

a parallel connection system including a plurality of connections, wherein the plurality of connections includes non-crossing connections between zones of the first arm and zones of the second arm configured to harvest signals of a same frequency range; and a plurality of multi-output channels, each output channel coupled to one of the non-crossing connections, and each multi-output channel having multiple feeding points, each capable of accommodating a receiver operating over multiple frequencies.

2. The antenna of claim 1, further comprising a controller configured to directly control the plurality of multi-output channels and to modify signals transmitted across the parallel connection system.

3. The antenna of claim 2, wherein the direct control of the plurality of multi-output channels facilitates an adaptation of the antenna for different applications, including at least one of detectors, sensors, optical-rectennas, and wireless communications systems including at least one of 4G, 5G, and 6G.

4. The antenna of claim 1, wherein each zone is sized in order of a desired radiation wavelength for targeted frequency bands.

5. The antenna of claim 1, wherein generated oscillations in each zone propagate through a specific channel connected to a counterpart of the channel in the opposite arm without crossing other channels.

6. The antenna of claim 1, wherein the plurality of multi-output channels and multiple feeding points allow for discrimination of output oscillations according to multi-incident waves frequency bands.

7. The antenna of claim 1, wherein the antenna has a compact design which enables integration with multiple other antennas.

8. The antenna of claim 1, wherein the parallel connection system between corresponding zones in opposite arms allows for blocking of undesired frequency bands without affecting a response to other frequency bands by the antenna.

9. A method of operating the antenna of claim 1, comprising:

capturing wideband frequencies from surrounding environment through the plurality of zones with varying sizes;

propagating generated oscillations in each zone through a specific channel connected to its counterpart in the opposite arm;

discriminating output oscillations at the plurality of multi-output channels and multiple feeding points;

accommodating multiple receivers operating over different frequency ranges; and controlling the output channels by separating, combining, or suppressing output signals according to a required operating frequency range.

10. The method of claim 9, wherein the controlling the plurality of multi-output channels allows for the customization of the antenna's response based on the desired application, including at least one of detection, sensing, energy harvesting, and wireless communication systems.

11. The method of claim 9, wherein the controlling the plurality of multi-output channels facilitates an adaptation of the antenna for different applications, including at least one of detectors, sensors, rectennas, and wireless communications systems including at least one of 4G, 5G, and 6G.

* * * * *